Figure 1:
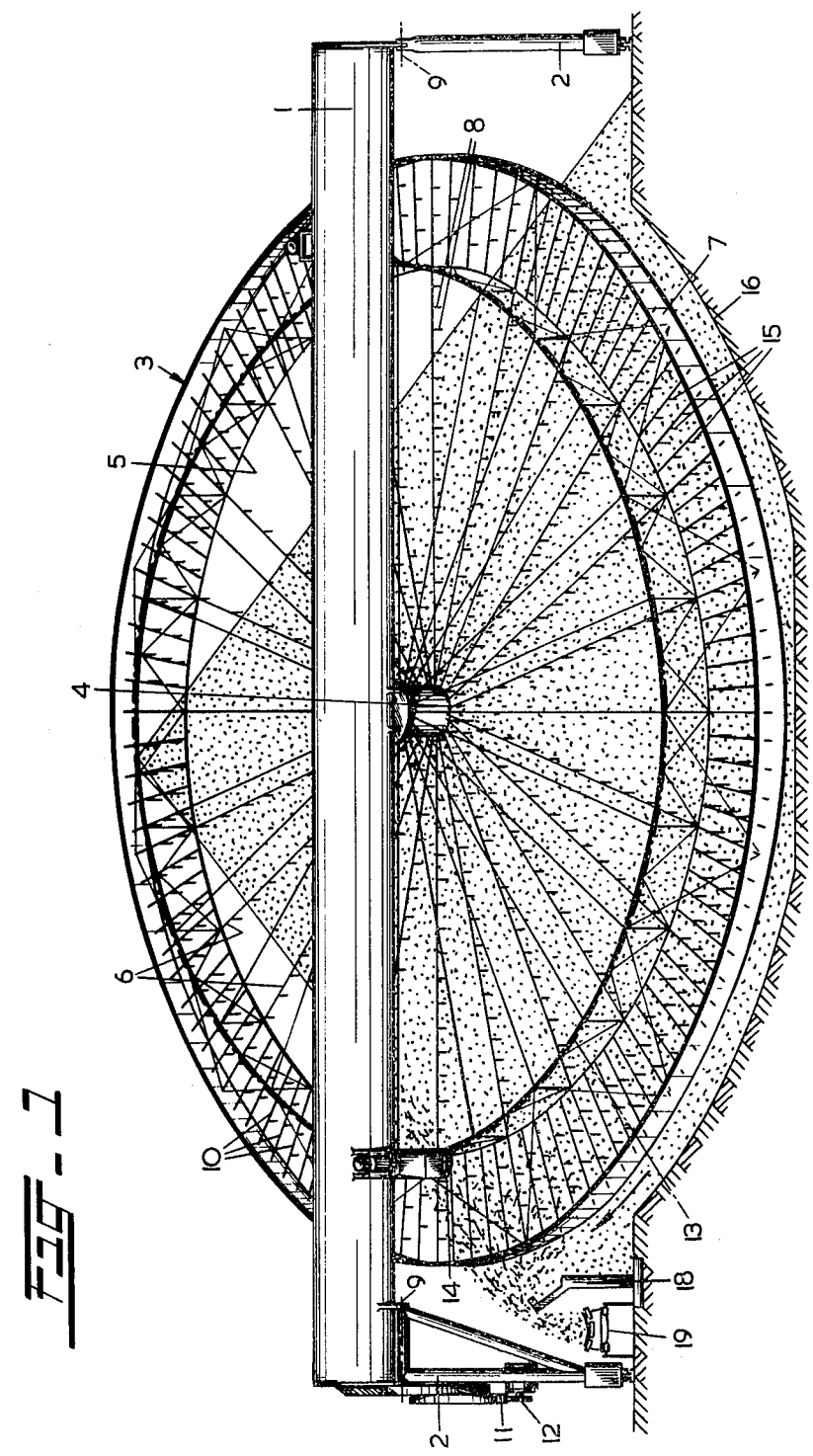

United States Patent [19]

Raabe

[11] 4,000,822
[45] Jan. 4, 1977

[54] RECLAIMER TO RECLAIM BLENDING BEDS, STORAGE BEDS AND THE LIKE

[75] Inventor: Johann A. Raabe, Badhoevedorp, Netherlands

[73] Assignee: International Handling B.V., Amsterdam, Netherlands

[22] Filed: Apr. 23, 1975

[21] Appl. No.: 570,643

[30] Foreign Application Priority Data

May 2, 1974 Netherlands ............... 7405913

[52] U.S. Cl. .................... 214/10; 198/519; 198/508
[51] Int. Cl.² .................... B65G 61/00
[58] Field of Search ........ 214/10; 198/9, 36

[56] References Cited
UNITED STATES PATENTS 1,696,216  12/1928  Stanhope ................... 198/9
2,864,514  12/1958  Bartram ..................... 214/10

*Primary Examiner*—Robert J. Spar
*Assistant Examiner*—George F. Abraham
*Attorney, Agent, or Firm*—Brumbaugh, Graves, Donohue & Raymond

[57] ABSTRACT

An apparatus for reclaiming material from a blending bed, storage bed or the like, comprises a movable bridge, a unitary rotatable means secured to the bridge for loosening material from a face of the bed and moving the loosened material across the face of the bed as a function of the rotation of said unitary means, the material so moved being discharged down a side of the bed abutting the face of the bed, and means adjacent the side of the bed for collecting and conveying the discharged material.

14 Claims, 4 Drawing Figures

RECLAIMER TO RECLAIM BLENDING BEDS, STORAGE BEDS AND THE LIKE

The present invention relates to a reclaimer to reclaim blending beds, storage beds and the like, comprising a movable bridge provided with digging and conveying means to remove material from a bed and to carry the material thus removed to a side of the bridge.

In industry, for example blast furnace and cement plants, consi-derable amounts of bulk materials, such as ores, additions, coal, limestone, are usually stocked in oblong material heaps, so-called blending or storage beds. Blending beds comprise a number of different materials which have been dumped on each other as layers. Storage beds generally consist of only one material. The reclaimers mentioned in the preamble of the Specification are used to recover these beds. The bogies of the machines move during reclaiming at both sides of the bed; the material is carried by the digging and conveying means to a conveyor-belt placed alongside the bed.

The digging means of a known reclaimer consist of a rotating cylindrical drum extending between the bogies and provided with buckets. Within the drum a conveyor-belt extends lengthwise. The bulk material is picked up by the buckets and is discharged through openings in the drum on the conveyor-belt inside the drum and from there on to a conveyor-belt alongside the drum runway. To loosen the material so that it may be moved easily to the buckets, a harrow is mounted in front of the drum, triangular in shape and provided with teeth. The harrow is moved backwards and forwards during the digging operation. The angle between the harrow and the horizontal plane lies between the sliding angle and the angle of repose of the material. Other known reclaimers of the kind mentioned in the preamble of this Specification comprise one or more digging wheels traversing backwards and forwards along or around the bridge, said wheels being also provided with buckets. Also here a conveyor-belt extends through the digging wheels or behind them whilst in front of the bridge there is a harrow provided with teeth. Machines having a digging drum or digging wheels and working in two directions are provided at both sides of the bridge with a harrow.

Said known machines reclaim the bed, usually built up of roof-shaped layers, in transverse direction, i.e. perpendicular to the direction of stocking. The drum-reclaimer has the advantage that it recovers the entire bed cross section at the same time. The material particles are well mixed and homogenized. The reclaimers with digging wheels reclaim the bed cross section by a backwards and forwards movement of the digging wheel(s). As a result thereof the machines have a cyclic movement and the reclaimed material shows chemical and physical variations in a cyclic pattern.

With the aforementioned machines, the functions of loosening (harrow), digging (drum or wheel) and transportation (conveyor-belt) are performed by separate devices.

The object of the present invention is to avoid such a disadvantage and to provide a machine as described in the preamble which combines the aforesaid functions in one device while maintaining excellent mixing properties and homogenization.

To this end, the digging and conveying means according to the invention comprise at least one rotatable disc attached to the bridge and having a rotating axis of which the projection on the horizontal plane in the working position in substantially parallel to the direction of movement of the bridge, which disc is provided with teeth arranged according to a certain pattern and protruding from the disc plane, and an outer ring for the side-ways transport of the material collected on the ring.

In principle, it is also possible to use more discs, e.g. two concentric discs, the inner and outer ring having different rotating speeds.

It is also possible to have small angles between the projection of the rotating axis and the direction of movement.

The angle between the disc-plane and the horizontal plane will lie between the angle of repose and the sliding angle of the material to be reclaimed. Due to the contact between the teeth rotating along with the disc and the material the cohesion between the material particles will be eliminated and the particles will move downwards along the face of the bed. The right choice of the inclined position of the disc, the position of the teeth in relation to each other, the rotating speed of the disc and the travelling speed of the machine will ensure a regular downward flow of material particles. The material collected by the outer ring is carried by the ring to the approximate place where the face of the bed changes over into the side of the bed. At that point the material taken along by the outer ring will slide from the outer ring onto the side of the bed and then along the side of the bed downwards where it is collected on a conveyor-belt. Between this conveyor-belt and the bed to be reclaimed a retaining wall is placed, which makes it possible for the material sliding down the side of the bed to fall on this conveyor-belt.

It is also possible to have the material fall on a conveyor-belt located in a tunnel. The tunnel should be provided with a slot above the conveyor-belt.

Generally it only will be possible for the material to slide on the conveyor-belt if either on — or next to — the side of the bed it has been built up to the level of the retaining wall.

At the discharge point of the outer ring, there is material of the entire face of the bed; therefore, optimum mixing and homogenization takes place.

It is evident that the machine during operation moves forward at a constant speed and that the disc rotates at a constant speed. The disc serves as loosening device of the material particles, as digging device and as conveying means. The capacity of the machine is determined by the travelling speed. The machine can be built comparatively light and inexpensive. The wear is negligible; the parts which are subjected to water, particularly the teeth and the wear-rim of the outer ring can be easily replaced.

There is a continuous flow of material from the bed face towards the outer ring and from the outer ring onto a side of the bed. The mixed material being discharged consequently does not show any cyclic repeating changes in the physical and chemical properties.

There is no wear at the point where the material falls from the outer ring onto the collecting conveyor, since the material slides along the side of the bed.

Each material has its own angle of repose and sliding angle. The disc will, therefore, generally be tiltable around an axis of rotation coinciding with the central axis of the bridge or parallel thereto.

A preferred execution of this principle is characterized in that the disc is not secured to the bridge through hinges and that the bridge is tiltably connected to the bogies.

When the machine is not in operation the tilting line coincides with the axis of gravity of the assembly consisting of bridge and disc; therefore, only a small force is required to tilt this assembly.

The tilting feature makes the machine extremely suitable for reclaiming a bed in two opposite directions.

The disc is preferably built of spokes extending between a central boss and an inner ring, while the outer ring is connected to the inner ring at a certain distance.

The material touched directly or indirectly by a tooth moves downwards along the bed face. When the material is about to stop moving it comes in the range of action of the next tooth, etc.

It has been proven that good results are obtained in both reclaim directions when the teeth are attached to the spokes in such a manner that on consecutive spokes the teeth are sprung in relation to each other by half a pitch length.

It is preferable that the teeth protrude from the disc plane at an adjustable length. As a result thereof the plane can be adjusted by the tips of the teeth to obtain a desired shape of the bed face. In many cases, the plane through the tips of the teeth will be slightly convexly curved. The teeth may consist of flexible material.

In order to prevent the material on the upward moving part of the outer ring from sliding back, it is possible to provide carriers in the form of teeth, blades or the like on or immediately inside the outer ring.

Provision is thus made that the particles in contact with the outer ring do not move in relation to this ring so that the inner surface of the ring does not wear off.

Slight wear will occur only when a small portion of the material will slide along the ring onto the side of the bed.

As a result of the circular shape of the disc and its slanting working position the active bed cross section will consist of a triangle and a circle segment. The projection of the active bed cross section on a vertical plane perpendicular to the centre line of the bed is a triangle and an ellips segment.

With an equal surface of the bed cross section the bed is narrower when the machine of the invention is used as compared to known reclaimers, which generally operate on a bed with a triangular bed cross section. This results in a more efficient use of the ground and a narrower building when the system is under cover.

It is preferable that the ground beneath the disc is deepened. In this case the rails on which the machine travels, as well as the collecting conveyor are on ground level.

It is also possible, however, to position the rails and the conveyor-belt on an elevation so that the entire system is above the ground. In both cases, the rails may lie at equal or different elevation.

To ensure that the face of the bed does not show a bulge near the centre of the disc it may be advantageous that the centre of the disc has a number of radial toothless rods protruding slightly more outside the disc plane than the tips of the teeth.

Figure 2:
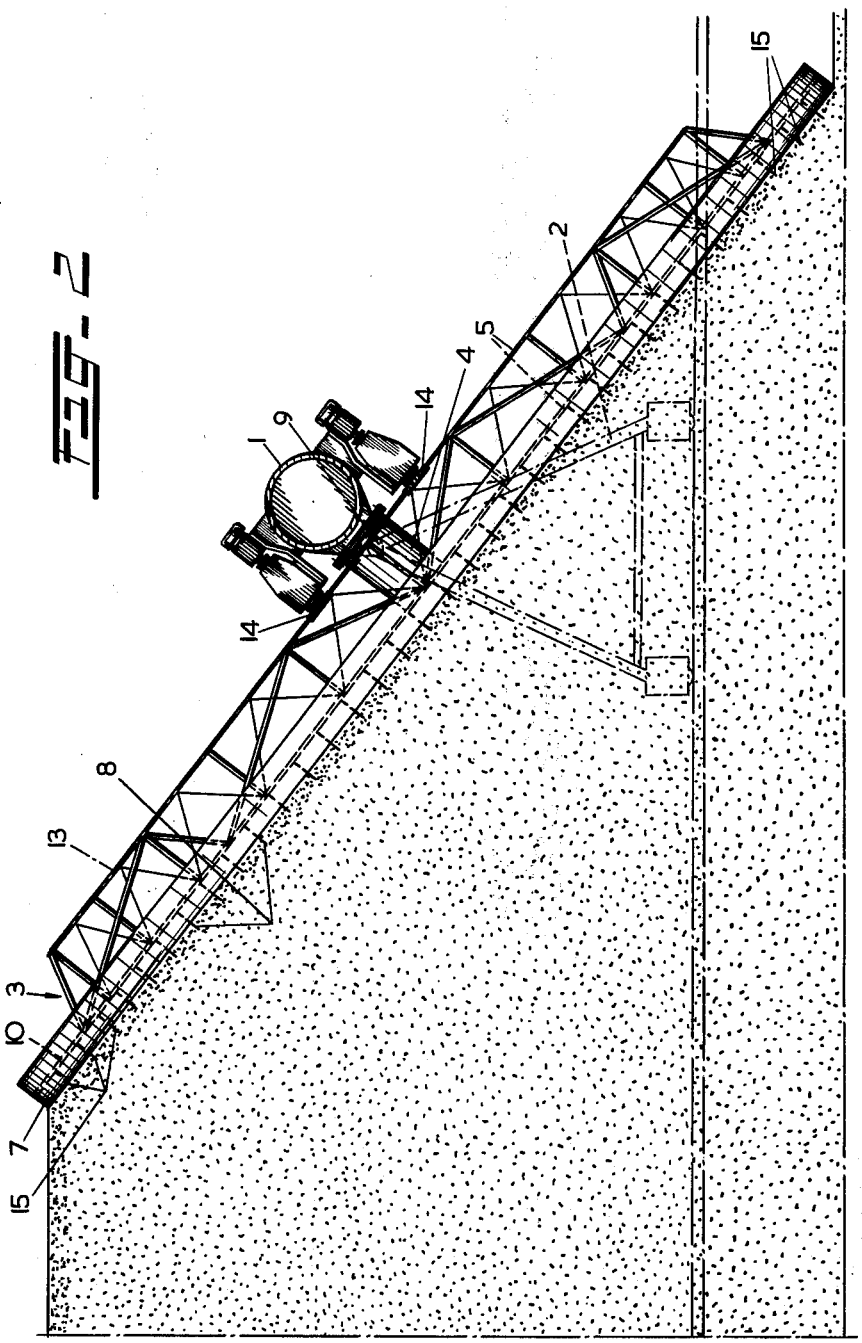
Figure 3:
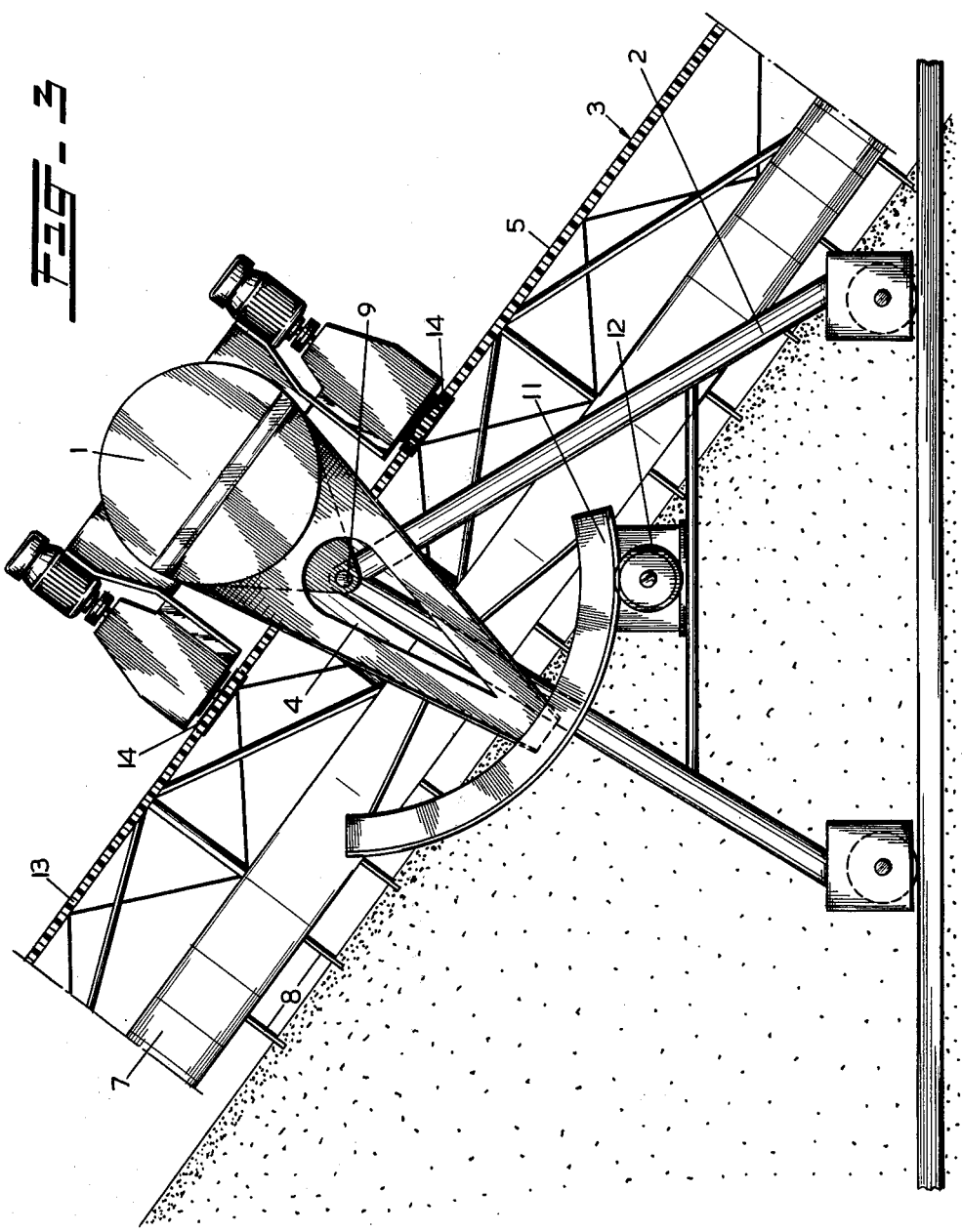
Figure 4:
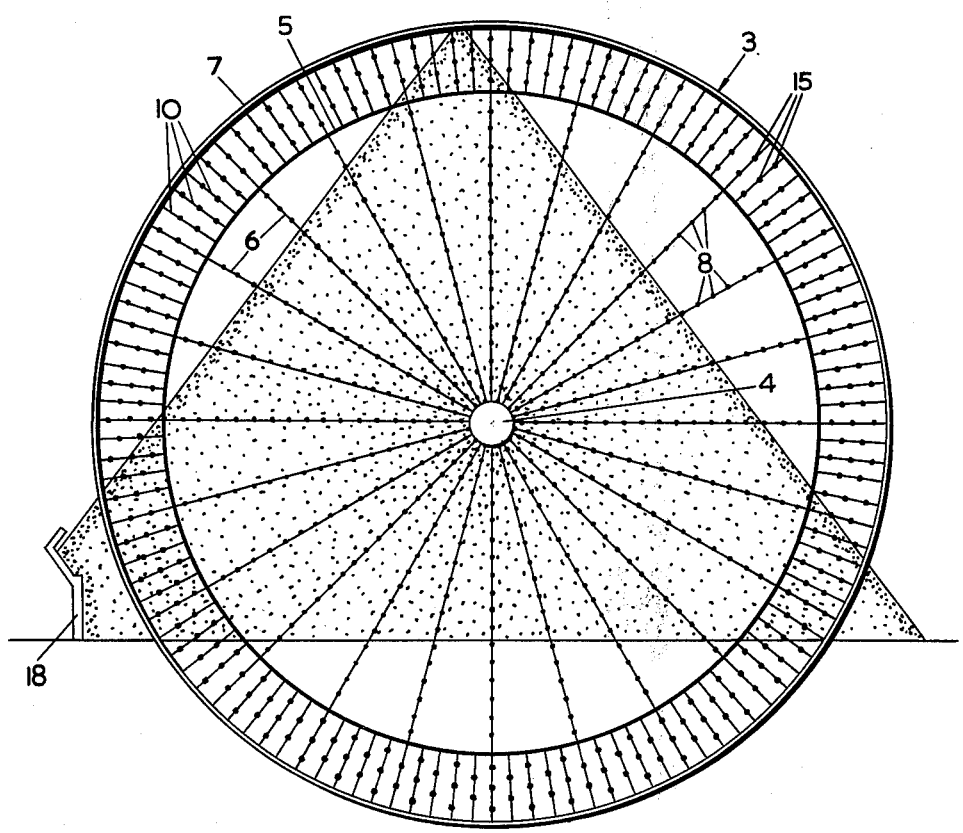

The reclaiming machine incorporating the features of the invention will now be described by way of example and with reference to the accompanying diagrammatic drawings, where in:

FIG. 1 represents a back view of the reclaimer;
FIG. 2 represents a cross sectional view;
FIG. 3 represents a side view on a larger scale of the tilting mechanisms; and
FIG. 4 represents a side view of a disc, particularly of the arrangement of the teeth and the carriers thereon.

The reclaimer according to the present invention is intended for reclaiming oblong blending or storage beds. The machine is particularly suitable for the mixing of material particles which have been dumped in layers to form a blending bed.

The machine comprises a bridge 1 supported at both end by bogies 2 which can be moved on rails perpendicular to the longitudinal direction of the bridge by known drive means not indicated further.

Disc 3 is rotatably mounted to the bridge 1. The rotating axis of the disc is transverse to the longitudinal direction of the bridge 1.

The disc 3 consists of a drum-shaped boss 4, an open inner ring 5, spokes 6 entending between boss 4 and inner ring 5, and a closed outer ring 7 mounted at a distance from the inner ring 5.

Teeth 8 are connected to the side of the spokes 6 facing the bed to be reclaimed and transversely to the plane of disc 3.

The assembly consisting of bridge 1 and disc 3 is tiltable around rocker shafts 9 which coincide substantially with the axis of gravity of the assembly, when the machine is not in operation.

FIG. 3 shows that a tooth segment 11 is attached to the bridge 1 which is built as a cylindrical drum; a pinion 12 driven by a motor engages the toothed segment. The inclined position of disc 3 can be set by rotating the pinion 12. The angular position is chosen between the angle of repose and the sliding angle of the material to be reclaimed.

Around the inner ring 5 a chain- or tooth ring 13 is mounted, in which chain wheels or pinions engage, driven by motor reducers supported from the bridge 1.

Connecting members 10 are mounted between the inner ring 5 and the outer ring 7, to which carriers 15 in the form of teeth are connected. Blade-shaped carriers are also possible.

The bed to be reclaimed lies partly in a deepening 16 in the ground. At the discharge side of the outer ring 7 (in FIG. 1 at the left side) a retaining wall 18 is placed next to the deepening 16. A conveyor-belt 19 is located next to the retaining wall 18.

The machine operates as follows:

By rotating disc 3 (see direction of arrow in FIG. 1) and having the machine travel slowly towards the bed the teeth 8 will come into contact with the material in the face of the bed to be reclaimed. As mentioned before, the disc 3 has in relation to the horizontal plane an angle which lies between the sliding angle and the angle of repose of the material. Due to contact with the teeth the cohesion between the material particles will be eliminated and the particles will move downwards along the face of the bed. The right choice of the position of the teeth 8 in relation to each other, the rotating speed of the disc 3, the inclined position of the disc and the travelling speed of the bridge, will ensure a regular flow of material particles. These particles reach the inner side of the closed outer ring 7 and are carried along by this ring. The particles are prevented from sliding back by the teeth 15 between inner ring 5 and outer ring 7. The material carried along is, thus, caught in the space between the slanting face of the bed, the outer ring 7 and the carriers 15. As soon as the material carried along reaches the left boundary rib (FIG. 1) between the face and the side of the bed, the material will slide from the outer ring 7 onto the left side of the bed and subsequently along this side downwards whereby the material will first pile up against the retaining wall 18 and then fall over this wall onto the conveyor-belt 19. The latter carries the material away.

It is evident that the disc 3 provided with teeth 8 and outer ring 7 combines the functions of agitator of the material particles in the face of the bed, of digging device and of conveying means.

The disc can be tilted into the opposite inclined working position via the horizontal position. The machine, therefore, can be used in two digging directions.

The disc can rotate in two directions and can, therefore, carry off the material to both sides.

The machine according to the invention can be fully automated and remotely controlled.

When the edge or the exchangeable wear-rim of the outer ring wears off, the ring maintains naturally its sealing property in that the bottom of the bed adjusts itself at once to the shape of the outer ring. There is no wear on the machine during the overflow because this takes place on the side of the bed to be reclaimed.

The pattern of the teeth 8 on the spokes 6 of the disc 3 is important to obtain a regular flow of material particles along the bed face towards the outer ring. FIG. 4 illustrates a possible pattern. The teeth 8 on consecutive spokes 6 spring with half a pitch length (pitch = equal distance of the teeth on one spoke). Due to this radio symmetric arrangement, the effect of agitation of the teeth in the upper part of the face of the bed is equal to the effect of agitation in the lower part. Moreover, the effect of agitation is the same with machines in which the disc operates in two directions of rotation, i.e. with a machine reclaiming beds in line and/or parallel beds.

With comparatively fine-grained material a comparatively small pitch is used.

With a bed of smaller width than the machine is designed, the disc 3 fills in the space between the wall 18 and the bed until the material flows over towards the conveyor-belt 19. Even then a residue of material will remain along the wall 18. This doesnot matter. Something similar happens when reclaiming the front cone at the beginning and reclaiming the rear cone of the bed at the end of the reclaiming process; firstly, displacement of material to the wall 18 occurs till the height of the wall has been reached.

The amount of material remaining in the rear portion of the bed might be limited by adapting the bottom at this point.

Within the scope of the present invention many modifications and additions are possible, such as the profile of the closed outer ring, the shape of the carriers and the teeth, the construction of the disc and the drive means of the disc, etc.

The teeth can be attached in such a manner, that their protruding length from the disc plane is adjustable. This provides an easy method to adjust the plane through the tips of the teeth to obtain a desired shape of the bed face. In many cases this shape will be slightly concave so that the plane through the tips of the teeth will be slightly convexly curved. The teeth can be made from flexible material. They can consist of solid round bars, hollow tubes and the like. Their cross section will, generally, be circular.

The material in the bed face near the boss of the disc is subject to the risk of being less agitated than the remaining part of the face. In order to prevent a resulting bulge in this face, the centre of the disc can have a number of radial, toothless rods, which protrude slightly more outside the disc plane than the tips of the teeth.

It is also possible to have a separately driven inner disc provided with teeth; such an inner disc is e.g. driven faster during operation of the machine than the outer disc concentrically mounted around the inner disc.

The tracks of the two bogies 2 of the bridge 1 need not necessarily be on the same elevation. To achieve that the material is lifted by the ring 7 to a lower level, one of the tracks must be on a higher elevation.

The ring 7 can be provided with an easily replacable wear-rim.

It is evident that the bed need not necessarily have a rectilinear principal direction. Beds arranged according to a circle portion (so-called polar system) can also be reclaimed by the machine subject of the invention.

I claim:

1. An apparatus for reclaiming blending beds, storage beds and the like, comprising a movable bridge and unitary means for reclaiming material from a bed and discharging the reclaimed material to one side of the bridge, wherein the unitary means consists of a rotatable disc mounted to the bridge and having an axis of rotation the horizontal projection of which is substantially parallel to the direction of movement of the bridge, said rotatable disc being provided with teeth arranged in a pattern and protruding from the plane of the disc for loosening material from a face of the bed, and with an outer ring which projects from the plane of the disc so as to form a surface for collecting the loosened material and moving said material side-ways to one side of the bridge.

2. The apparatus described in claim 1, wherein the rotatable disc is tiltably adjustable about an axis transverse to its axis of rotation.

3. The apparatus described in claim 1, wherein the bridge is rotatably mounted on bogies.

4. The apparatus described in claim 1, wherein the rotatable disc further has spokes extending between a central boss and an inner ring of the disc, said outer ring being secured in spaced relation to the inner ring.

5. The apparatus described in claim 4, wherein the teeth are attached to the spokes and arranged in a pattern such that the teeth on any one spoke are offset by half a pitch length from the teeth on an adjacent spoke.

6. The apparatus described in claim 1, wherein the teeth are adjustable so as to protrude a desired length from the plane of the disc.

7. The apparatus described in claim 1, wherein the teeth protrude from the disc such that a surface intersecting the tips of the teeth has a slight convex curvature.

8. The apparatus described in claim 1, wherein the teeth are made of flexible material.

9. The apparatus described in claim 1, wherein the disc further has carrier elements in the form of teeth, blades or the like arranged on or immediately inside the outer ring.

10. The apparatus described in claim 1 further comprising a retaining wall arranged alongside the bed at the discharge side of the bridge for defining a boundary of the bed in cooperation with a function of the reclaiming apparatus.

11. The apparatus described in claim 1, wherein the disc further has at its center a plurality of radial, toothless rods protruding slightly farther from the disc plane than the tips of the teeth.

12. An apparatus for reclaiming material from a blending bed, storage bed or the like, comprising a movable bridge, a unitary rotatable means secured to the bridge for loosening material from a face of a bed and moving said material across the face of the bed to be discharged to one side of the bridge in a direction of rotation of said means, retaining means arranged alongside the bed at the discharge side of the bridge for defining a boundary of the bed, and means adjacent the retaining means for collecting and conveying the discharged material.

13. The apparatus described in claim 12, wherein the unitary rotatable means is a circular member consisting of teeth protruding therefrom and a concentric outer ring projecting from the plane of said member so as to form a continuous annular surface for collecting material loosened by the teeth and moving said material in conjunction with rotational movement of said member across the face of the bed to the discharge side of the bridge.

14. An apparatus for reclaiming material from a blending bed, storage bed or the like, comprising a movable bridge, a unitary rotatable means secured to the bridge for loosening material from a face of the bed and moving said material across the face of the bed as a function of the rotation of said means, said material so moved being discharged down a side of the bed abutting the face of the bed, and means adjacent the side of the bed for collecting and conveying said discharged material.

* * * * *